United States Patent [19]

Plassmeier

[11] Patent Number: 4,586,123
[45] Date of Patent: Apr. 29, 1986

[54] DIGITAL CONTROL SYSTEM FOR THE SPEED OF A SEWING MACHINE

[75] Inventor: Horst Plassmeier, Herford, Fed. Rep. of Germany

[73] Assignee: Durkoppwerke GmbH, Bielefeld, Fed. Rep. of Germany

[21] Appl. No.: 555,186

[22] Filed: Nov. 25, 1983

[30] Foreign Application Priority Data

Nov. 25, 1982 [DE] Fed. Rep. of Germany ....... 3243549

[51] Int. Cl.$^4$ ............. G05B 19/18; G05B 19/29; G06F 15/46; D05B 19/00
[52] U.S. Cl. .................................. 364/167; 364/470; 318/603; 112/121.11; 112/121.12
[58] Field of Search ............... 364/148, 149, 150, 151, 364/167, 470, 565; 318/601, 603, 616, 617, 618; 112/121.11, 121.12

[56] References Cited

U.S. PATENT DOCUMENTS

| | | | |
|---|---|---|---|
| 3,742,487 | 6/1973 | Tripp | 318/603 X |
| 4,107,592 | 8/1978 | Bayer | 112/121.11 X |
| 4,147,119 | 4/1979 | Dunn | 112/121.11 X |
| 4,201,144 | 5/1980 | Manabe et al. | 112/121.12 |
| 4,219,766 | 8/1980 | Lin | 318/603 X |
| 4,368,412 | 1/1983 | Inoue | 318/603 X |
| 4,391,211 | 7/1983 | Yamamoto et al. | 112/121.12 |
| 4,398,241 | 8/1983 | Baker et al. | 364/167 |

*Primary Examiner*—Jerry Smith
*Assistant Examiner*—Jon D. Grossman
*Attorney, Agent, or Firm*—Karl F. Ross; Herbert Dubno

[57] ABSTRACT

A fully digital control system for the speed of the arm shaft of a sewing machine provides separate counters for counting a counting frequency during the pulses and pulse intervals of a lower frequency increment generator measuring the actual value of the shaft speed. The inverse of the last complete count thus registered is compared with a set point value in a microcomputer preprogrammed with data blocks representing these set point values and provided with parameters for the respective keying ratios associated therewith. The control bus and data bus connecting the counters with the microcomputer also connect the latter to another unit including a bit-rate generator and a programmable retriggerable multivibrator from which the digital output signal is emitted to effect direct control over a DC motor or to drive a clutch connected to the shaft.

11 Claims, 12 Drawing Figures

DIGITAL CONTROL SYSTEM FOR THE SPEED OF A SEWING MACHINE

FIELD OF THE INVENTION

My present invention relates to a digital control system for the speed of a sewing machine or for a sewing machine system and, more particularly, to a fully digitalized speed control controller for such machines.

BACKGROUND OF THE INVENTION

The arm shaft of a sewing machine or sewing machining installation, e.g. an installation for the automatic high speed sewing of various patterns and materials, frequently must be driven at various speeds depending upon the requirements of the contour of the pattern to be stitched and it is not uncommon for a given stitching operation to require arm shaft speeds between a very slow minimum or even zero-speed to a maximum speed for straight seam simple stitch sewing.

The arm shaft of the sewing machine is customarily driven by an electric motor and the speed of the arm shaft can be controlled by electrically operated clutch and brake means, controlling the torque transfer to the arm shaft from the motor or the rotation of the arm shaft.

It has been proposed heretofore to couple the shaft or the motor or some other element rotating synchronously with the arm shaft with a tachometer or other means for providing an analog signal or even a means for providing a digital signal representing the speed of the arm shaft, to provide a controller with an input representing a set point value of the speed of the arm shaft, and to digitally compare the set point and actual speed values to produce an error signal which is applied to the brake clutch combination to modify the arm shaft speed in accordance with the set point value. The set point value generator was generally a knee- or pedal-operated element.

Such means is provided, for example, in the system described in German patent document—open application DE-OS No. 24 15 359 which provides for the stopping of the arm shaft of a sewing machine in a predetermined angular position. In this case actual value measurement of the arm shaft speed is effected in an analog manner with a tachometer or tachogenerator connected fixedly with the arm shaft. The analog set point value is generated by short-circuitable resistance elements and after the set point-actual value comparison, the control magnitude is applied as a voltage with variable keying ratio to the brake/clutch comparison. Obviously, this system does not provide full digitalized speed control and time consuming setting and initializing of the potentiometer in the control system cannot be avoided.

A positioning drive with at least one 8-bit microprocessor is also known in the literature, e.g. from German patent document DE-OS No. 29 38 040. Here the actual value of the arm shaft speed is generated by an optoelectronic increment generator fixed to the arm shaft to provide a digital output while the set point value in analog form is obtained with a resistor/condenser circuit operating a voltage-controlled oscillator and after set point-actual value comparison the control magnitude in digital form is applied with variable keying to the brake/clutch combination. Here again potentiometer initialization or zeroing is required.

OBJECTS OF THE INVENTION

It is the principal object of the present invention to provide a fully digitalized speed controller for the arm shaft of a sewing machine which can greatly facilitate sewing machine control and operation.

Another object of this invention is to provide a digitalized system for the purposes described which eliminates the drawbacks of earlier speed controls for sewing machines.

It is also an object of this invention to provide a compact, low cost, highly versatile speed controller which does not require initialization of potentiometers and like elements.

SUMMARY OF THE INVENTION

These objects and others which will become more readily apparent hereinafter are attained, in accordance with the present invention, in a speed controller for a sewing machine which is fully digitalized and comprises a microcomputer associated with two additional circuit elements which are coupled together and with the microcomputer by a control bus and a data bus for data transfer with the microcomputer.

According to the invention the microcomputer generates a rectangular voltage $U_c$ with a quartz-stabilized counting frequency $f_c$ which is applied to the clock inputs of two counters in one of the circuit elements while the arm shaft is provided with an increment generator producing a rectangular voltage $U_i$ with a frequency $f_i$ which is applied to the gate input of one of these counters and to the input of an inverter whose output is applied to the gate input of the other of these counters. The gate input of this other counter is connected with a port of the microcomputer so that with set point-actual value comparison, the control deviation is generated in binary form inverses of the set point and actual value magnitudes. The microcomputer is also preprogrammed with a data block for each set point value, each data block including individual parameters for the calculation of the keying ratio V for the various control magnitudes which may result from the associated set point value. Consequently, the control magnitude is generated by the application by the microcomputer of the rectangular voltage $U_c$ to the clock input of a bit-rate generator of the other circuit element as well as to the clock input of a programmable and retriggerable monostable multivibrator of this circuit element. The rectangular voltage $U_o$ at the output of the bit-rate generator is applied at a gating input of the multivibrator so that the rectangular voltage $U_k$ is generated at the output of the latter to form the control magnitude for the speed regulation of the sewing machine.

The potentiometer of the prior art is eliminated and, because the comparison takes place directly between inverses in digital form of the set point and actual speed values, for each set point value and the deviation signals thus produced, the respective parameters of controlling the keying ratio for the control magnitudes can be derived from the computer.

This provides a number of advantages. For example, it affords completely digital speed control with few elements utilizing only a single 8-bit microcomputer.

The microcomputer is relieved from the tasks of digitally forming the actual value and set point values so that it can be utilized for storage of the critical parameters for control purposes, for processing these parameters and for providing proportional or proportional-integral control modes or other control modes as may be desired.

Zeroing and initializing requirements are eliminated since all frequencies for both the set point generator and the actual value counter can be produced by the quartz-stabilized clocking output of the microcomputer.

A delay-free measurement of the arm shaft speed can be achieved by counting the pulses of counting frequency since the increment generator for the actual speed value can have a frequency which is low by comparison with the counting or clock frequency.

According to a feature of the invention, the rectangular voltage $U_k$ of the frequency $f_k$ is applied directly to a clutch drive of the clutch associated with the electric motor. The integration time $T_m$ over which integration can be carried out for PI control, can be determined, according to another feature of the invention, by the duration for recycling of the program through which the microcomputer operates according to the invention.

Finally, I note that the voltage $U_k$ can be applied directly to a direct current motor driving the arm shaft if desired.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
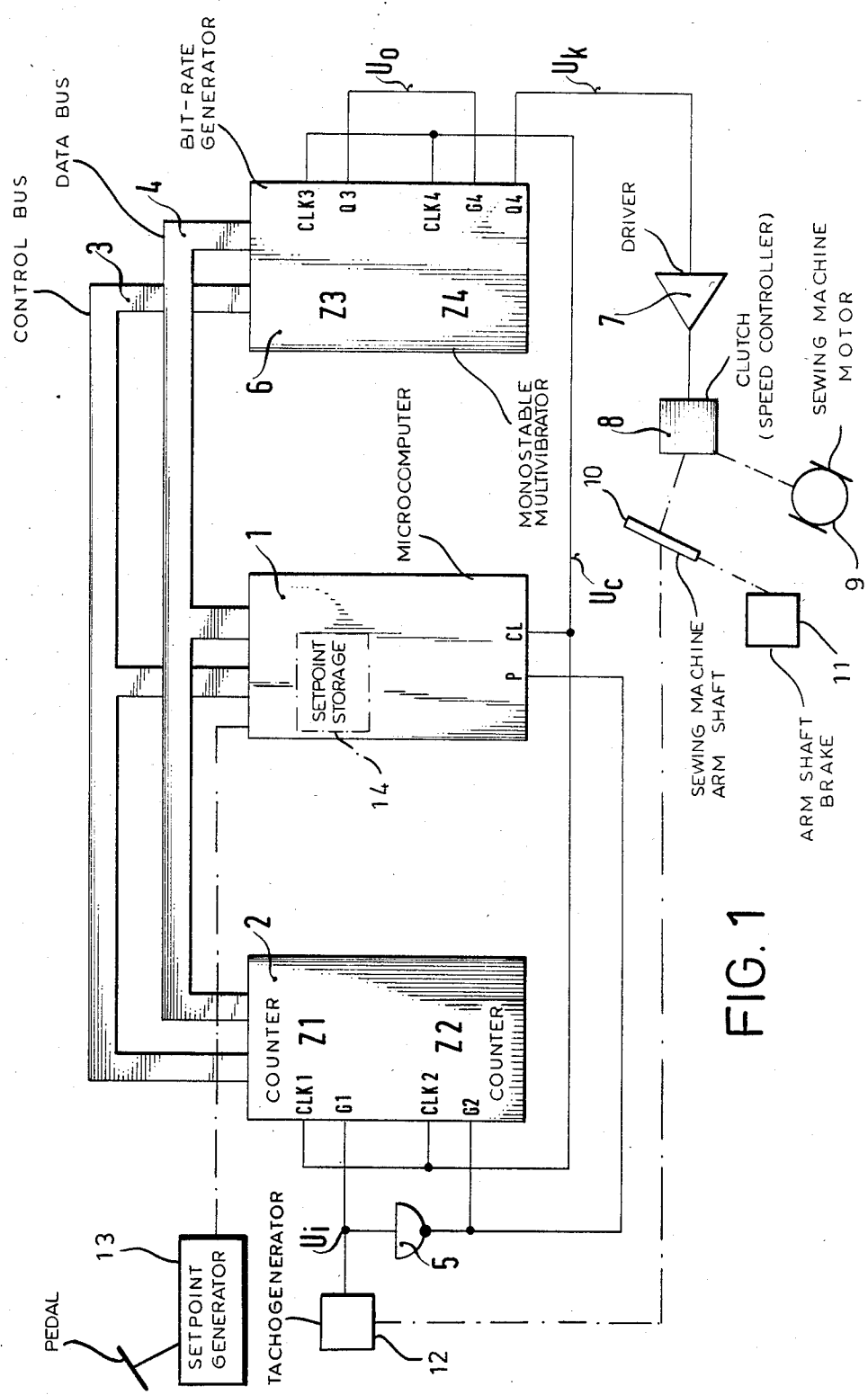
FIG. 1 is a block diagram illustrating the basic circuit elements of the invention.

The control system diagrammatically illustrated in FIG. 1 comprises an 8-bit microcomputer 1 which can be of the type manufactured by Intel and designated type 8748 (see *Microcomputer-Based Design*, John B. Peatman, McGraw-Hill Book Company, New York, 1977) which can operate in conjunction with the integrated circuits 2 or 6 of the type marketed by Intel and known by the designation 8253.

For data transfer, the integrated circuits 2 and 6 are connected together and to the microcomputer 1 by a control bus 3 and a data bus 4.

By appropriate programming, the integrated circuit 2 can be treated as having two counters Z1 and Z2, while the integrated circuit 6 has a bit-rate generator Z3 and a programmable and retriggerable monostable multivibrator Z4.

As is also apparent from FIG. 1, the output CL of the microcomputer 1 is applied directly to the counter input CLK 1 and CLK 2 of the counters Z1 and Z2 of circuit 2 and to the input CLK 3 of the bit-rate generator CLK 4 is the multivibrator Z4 of the circuit 6.

Between the gate input G2 of the counter Z1 and the gate input G2 of the counter Z2, an inverter 5 is provided. The gate input G2 is connected with the port P of the microcomputer 1.

The output Q3 of the bit-rate generator Z3 is connected with the gate input G4 of the multivibrator Z4 and the output Q4 of the latter is connected to a driver 7 for the clutch 8 of the electric motor 9. Via this clutch, the motor 9 drives the arm shaft 10 of the sewing machine, the speed of which may be limited by an electrically operated brake 11. A tachogenerator 12 connected to the shaft 10 supplies the signal $V_i$ representing the actual speed value and an input to the microcomputer can include the setpoint generator 13.

The driver is here shown to be an amplifier and can supply at its output the voltage necessary to operate the electromagnetic clutch of the sewing machine motor. The operation of the controller, which will be clear from the information flow diagram of FIG. 6 and the functional connection diagram of FIG. 5 will be described in greater detail below.

It is important to note that the microcomputer 1 cooperates only with the integrated circuit 2 of the actual value measurements and only with the integrated circuit 6 to produce the control signals for the operator or operators.

The microcomputer 1 supplies to the inputs CLK 1 and CLK 2 of counter Z1 and Z2 a rectangular voltage $U_c$ with a quartz-stabilized counting frequency $f_c$.

The actual value input is supplied by the conventional increment generator 12 which can be fixed to the arm shaft of the sewing machine. The increment generator supplies a rectangular voltage $U_i$ with a frequency $f_i$. The increment generator is so arranged that the pulse duration of the rectangular voltage $U_i$ is equal to the pause or interval between two pulses. The counting frequency $f_c$ is thus large by comparison to the frequency $f_i$.

The gate input G1 receives the rectangular voltage $U_i$. The inverter 5 applies the inverse of the voltage $U_i$ at the gate input G2 of the counter Z2. Via the port P the microcomputer can establish for a given point in time whether a pulse or pulse interval between two pulses of the voltage signal $U_i$ is present.

Figure 2:
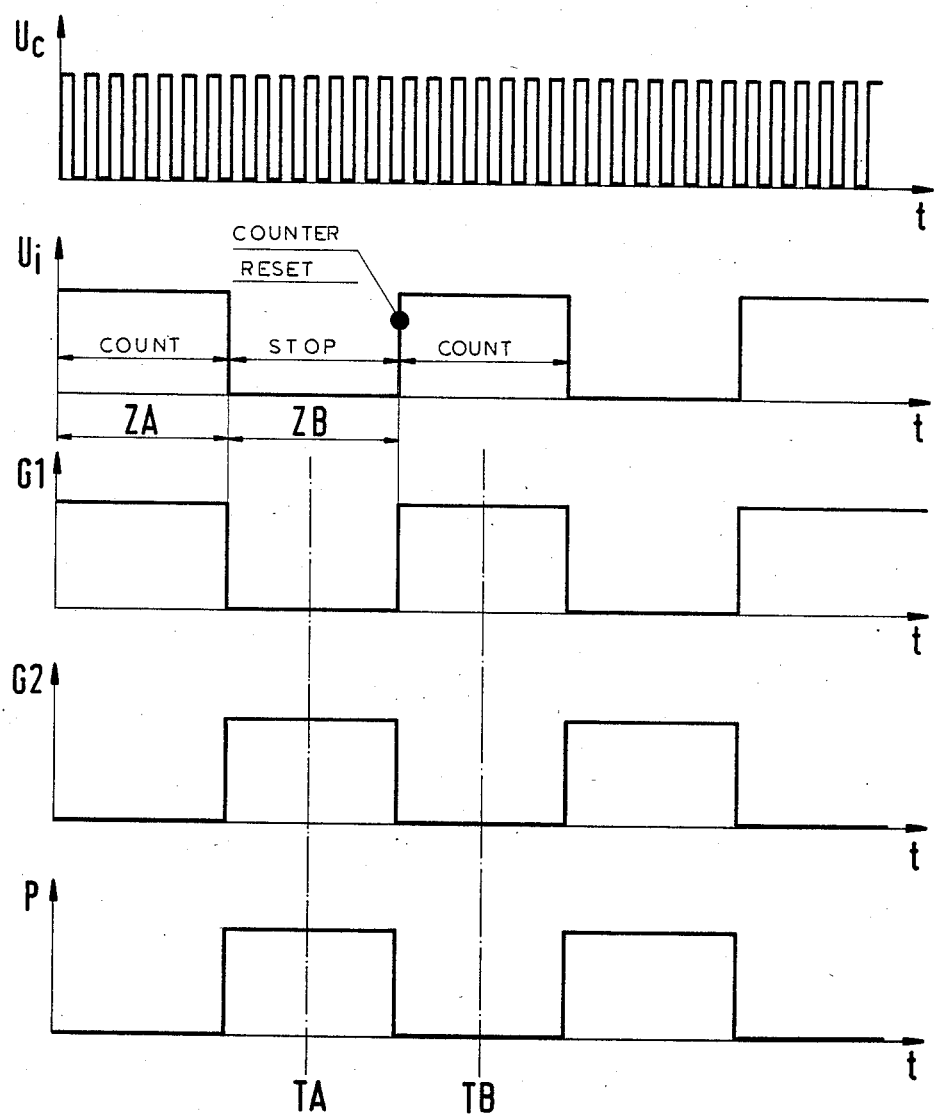
FIG. 2 is a voltage-time diagram illustrating the actual value measurement of the speed of the sewing machine arm shaft.

From FIG. 2 the program functioning of the two counters Z1 and Z2 will be apparent, the illustrated example being for the counter Z1. The counting frequency $f_c$ is applied to the input CLK 1.

As a result of the rising flank of the rectangular voltage $U_i$ at the gate input G1, the counter Z1 is set to a zero point and begins counting the pulses of the voltage $U_c$. This interval is the interval represented at "count" in FIG. 2. At the descending flank at the input G1, the count is held and as long as the gate input G1 is at its low level (L-level), the count can be recalled.

Figure 3:
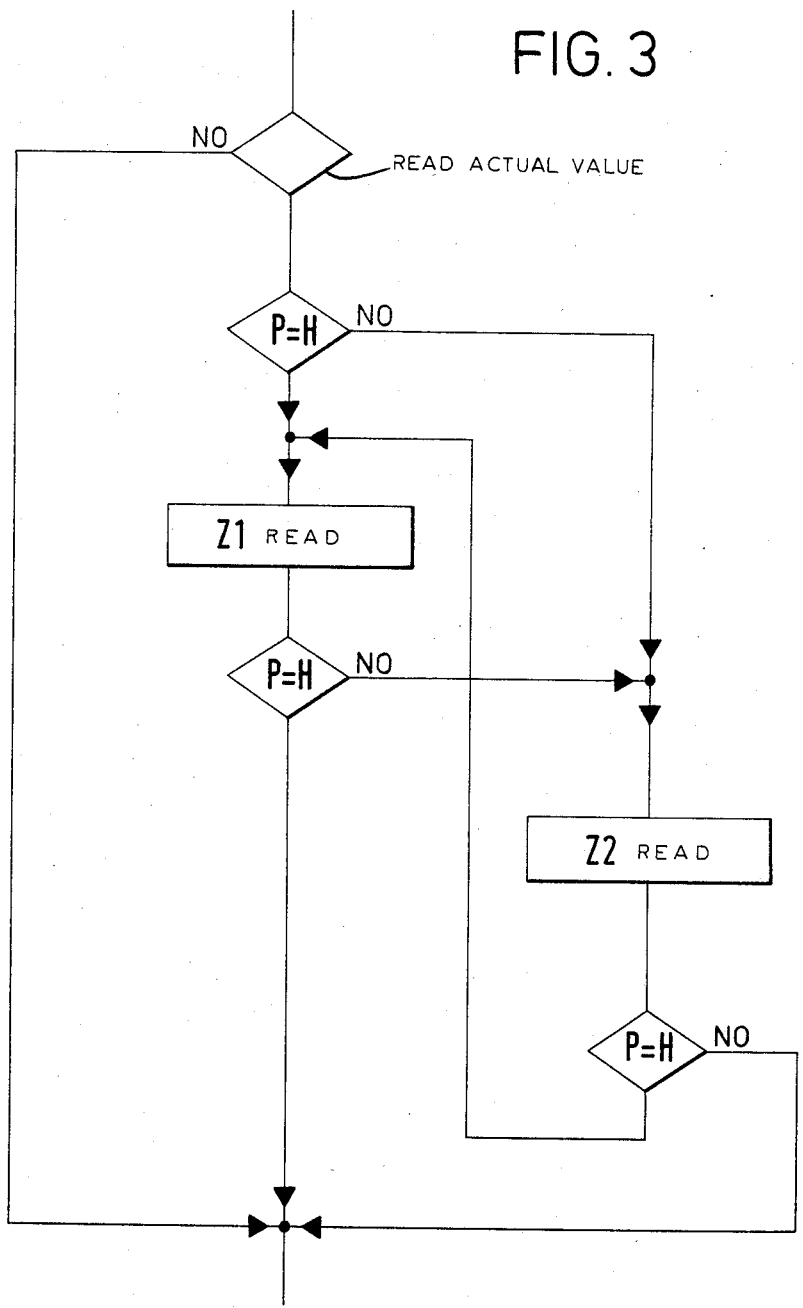
FIG. 3 is an information flow diagram for the actual value measurement.

FIG. 3 illustrates the actual value detection. In information flow diagram, P represents the port of the microcomputer 1 and H represents the high level. The counters Z1 and Z2 count the pulses of the voltage $U_c$ when the corresponding gate inputs G1 and G2 are high (H).

The circuit 2 is programmed so that the counter Z1 will count during the pulses of the voltage $U_i$ while the counter Z2 counts during the pulses or intervals between two pulses of the signal $U_i$. In addition the inverter is connected so that during the counting phase of one counter (say G1 at H-level), the other counter is blocked (say G2 at L-level) via the port P so that the microcomputer can determine for any point in time which counter is blocked and thus can be read. For example, when the port P is at the high level H, counter Z1 can be read and when port P is at the low level L, the contents of counter 22 can be read.

If the microcomputer receives the instruction at the point TA to read the actual value, i.e. the command "read actual", as illustrated in FIG. 3, it evaluates the contents of the counter Z1 and hence the count which has accumulated in the interval ZA (FIG. 2). This count represents the duration of the last received pulse of the actual value generator in binary form or coding. When count at the time TA is read from the counter 21, the counter Z2 counts the pulses of the signal $U_c$ which are generated during the immediately preceding interval between two pulses of the signal $U_i$.

If the microcomputer 1 receives the "read actual" command at the point TB (FIG. 2) it determines the count from the counter Z2 which was accumulated in the period ZB (FIG. 2), namely a count which provides in binary coding a representation of the duration of the last pause between two pulses of the signal $U_i$.

For cost reasons, the actual value measurement is provided with an increment generator which produces for each revolution of the arm shaft a comparably small number of impulses and preferably the smallest possible number of such impulses. For this reason, in the past, it has been customary to provide doubling circuitry for producing the actual value frequency. This required zeroing and balancing operation. By comparison therewith the system of the invention can evaluate a single pulse or a single pause or interval between two pulses to produce the actual value signals of a given frequency. This eliminates the need for doubling circuits and the problems encountered therewith.

Because at any instant in time, the actual value signal representing the arm shaft speed may be requested, this signal is continuously applied to the microcomputer 1 in binary form for the last computed pulse or the last computed pulse between two pulses of the frequency of the increment generator.

The interval between the production of one measurement value and the next measurement value is dependent only upon the spacing of the signal from the increment generator. This eliminates the need for the conventional means for producing average values of the actual value by summation of the pulses and, of course, the time required for the summation operations.

From FIG. 3, it will be apparent that the microcomputer, in response to the command "read actual value" monitors the state of the port P.

If the port P is at the H-level, counter Z1 is read. The time for this read operation is finite. During the period of this read operation a rising flank of the rectangular voltage $U_i$ applied at G1 can falsify the measurement because this rising flank at the counter Z1 can reset it to zero and recommence the count. To exclude such a measurement falsification, from reading of the counter Z1, the state at the port P is once again monitored.

If the port P remains at the H-level, the read count is effective and can be used in the event the port P is at the L level indicative of the application of the falsifying flank, the counter Z2 is read and its count is utilized if, again upon checking the port P, the L-state prevails.

Of course, if port P upon the generation by the microcomputer 1 of the "read actual value" command is originally at the L-level, the counter Z2 is read and after this reading the state of port P is again checked. If port P remains at the L-level, the read value is not false and can be used. However, if now the level at port P is found to be H, thereby signaling falsification, the reading of the counter Z1 is substituted in the manner already described and hence, even at very high speeds of the arm shaft, only nonfalse or checked values can be utilized.

The rectangular voltage $U_c$ supplied by the microcomputer 1 is applied during the formation of the set point value at the input CLK 3 of the bit-rate generator Z3 of the circuit 6 as well as to the input CLK 4 of the programmable and retriggerable monostable multivibrator Z4 of this circuit.

Figure 4:
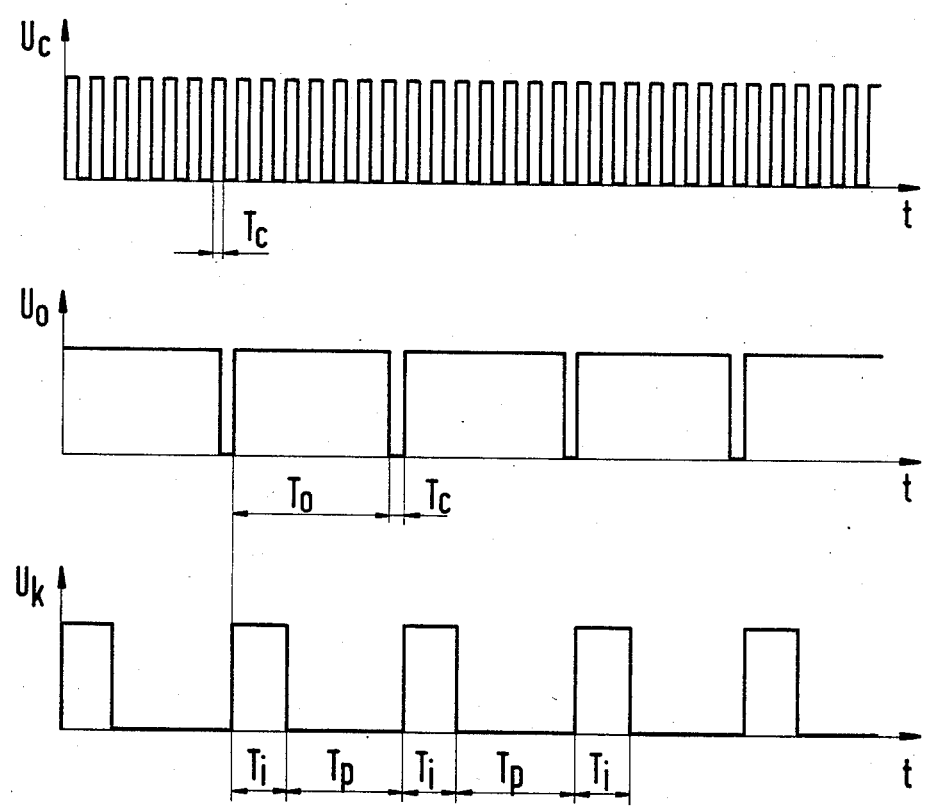
FIG. 4 is a voltage-time diagram illustrating the formation of the set point value.

The cooperation between the microcomputer 1 and the bit-rate generator Z3 of the multivibrator Z4 will also be apparent from the pulse diagram of FIG. 4.

The magnitude $T_c$ represents the duration of one pulse of the count frequency $f_c$. The duration of the one pulse of the rectangular voltage $U_o$ produced by the bit-rate generator Z3 has been represented at $T_o$. The latter is an integral multiple of $T_c$. For example, $T_o = 1000 \times T_c$.

The duration $T_o$ is fed to the bit-rate generator Z3 in binary code by the microcomputer 1 in initializing the circuit.

The sum $T_o + T_c$ establishes the oscillation period of the set point value. Since this is some 3 powers of ten greater than $T_c$, the effect of $T_c$ upon this value can be ignored.

Since the multivibrator Z4 is retriggerable, at each rising flank of the rectangular voltage $U_o$ applicable to the gate input G4, the multivibrator generates an impulse of the duration $T_i$. The latter is an integral multiple of $T_c$ and is supplied during initialization with binary coding to the multivibrator Z4.

With $T_o = 1000 \times T_c$, $T_i$ can have values from $1 \times T_c$ to $999 \times T_c$.

The rectangular voltage $U_k$ formed by the multivibrator Z4 (see FIG. 4) is the control value which is applied directly to the operator 7 of the clutch 8 of the motor.

Since $T_c$, as previously noted, has been ignored, the frequency $f_k$ of the rectangular voltage $U_k$ has the oscillation period $T_o$. The latter is set upon initialization by the microcomputer. However, $T_o$ can be varied as may be required by the control algorithm.

Starting with the assumption that $T_c$ will be ignored, the duration $T_p$ as shown in FIG. 4 will represent the difference between $T_o$ and $T_i$. This permits definition of the keying ratio V as $$V = \frac{T_i}{T_p} \text{ or } V = \frac{T_i}{T_o - T_i}$$

This keying ratio for the rectangular voltage $U_k$ ensures a mean current in the clutch 8 which determines its transfer moment and thus the speed of the arm shaft. By the initial setting of $T_i$ and/or $T_o$ in the bit-rate generator Z3 or the multivibrator Z4, the microcomputer 1 is provided with a given keying ratio V for the controlling value.

Since the generator circuit of the element 6 in FIG. 1 maintains the predetermined key ratio V until other values are provided for $T_i$, the microcomputer 1 remains free for other operations, for example, "read actual vaue", "set point-actual value comparison", etc. The fineness or precision of the setting is given by the ratio $T_c/T_o$ and, as described, this ratio can have a value of 1/1000. Consequently, the setting of the control value can be considered to be practically stepless.

In the actual value measurement in the heredescribed system, the measured value is a binary value which is inversely proportional to the arm shaft speed. For speed control it is customary to effect a set point-actual value comparison to obtain a difference signal D which is directed proportional to the deviation of the actual speed from the set point speed and to determine the control value from this deviation D.

This approach is not possible with the system of the invention because the 8-bit microcomputer 1 cannot form the inverse of the measured value in the available time. Use of a microcomputer having a larger word capacity, however, permits the economical use of this capacity by exploiting the ability of the microcomputer to operate as an arithmetic processor.

Accordingly, I can preprogram the computer with set point values which are each inverses of the desired set point speed signals and can utilize a multiplicity of such preprogrammed inverse set point values as constants in the program storage of the microcomputer 1.

The microcomputer program thus selects which of these stored inverse set point values are utilized for control, i.e. for comparison with the corresponding inverse actual value measurement. Unless otherwise stated, when the set point value at the microcomputer or the actual value in a binary form are discussed, the inverse form which is actually processed will be meant.

Instead of a programmed selection of the set point value from the microcomputer memory, I may provide for the selection of the set point value by a selector switch or by some conventional set point generator associated with the control panel of the sewing machine, e.g. the selector 13.

The invention utilizes, therefore, the advantage of preprogramming a multiplicity of set point values in the program storage of the microcomputer which eliminates the need for more complex and less sophisticated arrangements whereby the set point values can be represented as a combination of resistance values and/or various resistance/capacitance combinations.

In the conventional systems in which set point values must be set by clock elements of the latter type, balancing and equalization operations must be carried out, thereby limiting the flexibility of this system in the sense that different systems may be required for different sewing machines or automated sewing machine installations, or individual zeroing and balancing of the system may be required for each machine or each machine of different type in which the control system is applied.

In the system of the invention the set point-actual value comparison is effected by the arithmetic determination of the difference between the inverse set point value SW and the inverse of the measured value IW. This difference is proportional to the deviation of the actual speed for the set point speed, i.e. the speed deviation or error.

With only minor differences of the set point value from the actual value the control response utilizes the fact that there is a practically linear relationship (see FIG. 12) between the actual value speed and the control deviation D.

The following example will demonstrate the operation.

The following parameters apply:
Counting frequency $f_c = 2$ MHz.
Pulse count from actual value generator = 50 pulses/revolution of the arm shaft.
Actual speed = 600 rpm.
Duration of one rotation of the arm shaft = $T_1 = 1 \cdot 60/600 = 0.1$ second.
Pulse and pause duration of $LI_1$ (the value of 100 in the denominator of the fraction given by 50 pulses separated by 50 pauses or intervals):

$$T_2 = T_1/100 = 0.1/100 = 1 \text{ ms}$$

Actual value:

$$IW = T_2 \cdot f_c$$
$$= \frac{1 \cdot 2000000}{1000} = 2000$$

Consequently, for an actual speed of the arm shaft of 600 rpm, during each actual value pulse of the frequency $U_1$, 2000 pulses of the frequency $U_c$ are counted.

The following table shows the calculation of the difference in terms of the count in pulses for deviations from the set point value of 600 rpm. In this table the left-hand column represents the actual speed, the center column the number IW of actual value counter pulses corresponding to the actual speed, and the right-hand column the deviation D in terms of the different form by subtracting the actual value pulses from the set point values:

| Actual speed (rpm) | IW | D = SW − IW |
| --- | --- | --- |
| 594 | 2020 | −20 |
| 595 | 2017 | −17 |
| 596 | 2013 | −13 |
| 597 | 2010 | −10 |
| 598 | 2007 | −7 |
| 599 | 2003 | −3 |
| 600 | 2000 | 0 |
| 601 | 1997 | 3 |
| 602 | 1993 | 7 |
| 603 | 1990 | 10 |
| 604 | 1987 | 13 |
| 605 | 1983 | 17 |
| 606 | 1980 | 20 |

Figure 12:
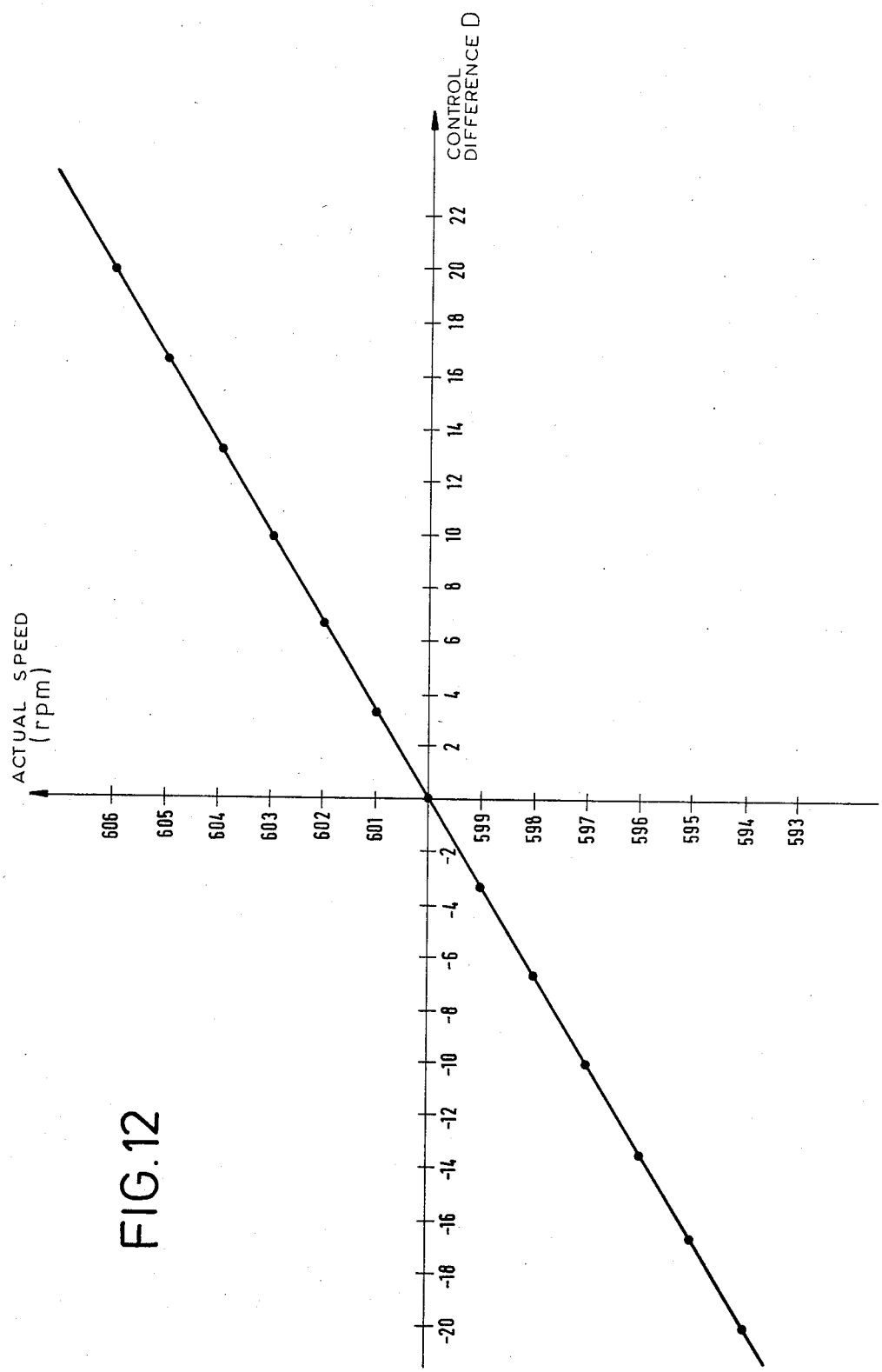
FIG. 12 is a graph in which the relationship between the actual speed and the control deviation of difference has been plotted.

This table and FIG. 12 demonstrate the practically linear dependency of the control deviation D, determined by the difference of the actual value count from the set point count inverses, with variation in the actual speed.

Because the microcomputer, through the use of the circuits 2 and 6, is relieved of the task of measuring the actual value during reading of the set point value, during the formation of the control value $U_k$, there is sufficient time for the calculator of the latter so that continuous control, discontinuous control or mixed control systems can be provided, the algorithm being simply determined by the programming of the microcomputer 1.

In the following, I describe the operation of a continuous controller according to the invention, operating with proportion-integral control characteristics, (i.e. PI-characteristic) for the clutch 8. The PI-characteristic can be superimposed upon discontinuous control operations or discontinuous control operations can be superimposed upon the PI-characteristic.

For example, for a speed-sensitive switching of the clutch 8, a maximum possible energization of the latter or of the brake to cut either in or out can be effected.

To this end, the braking and acceleration characteristics can be optimized and wear of the clutch or brake linings can be minimized.

Figure 5:
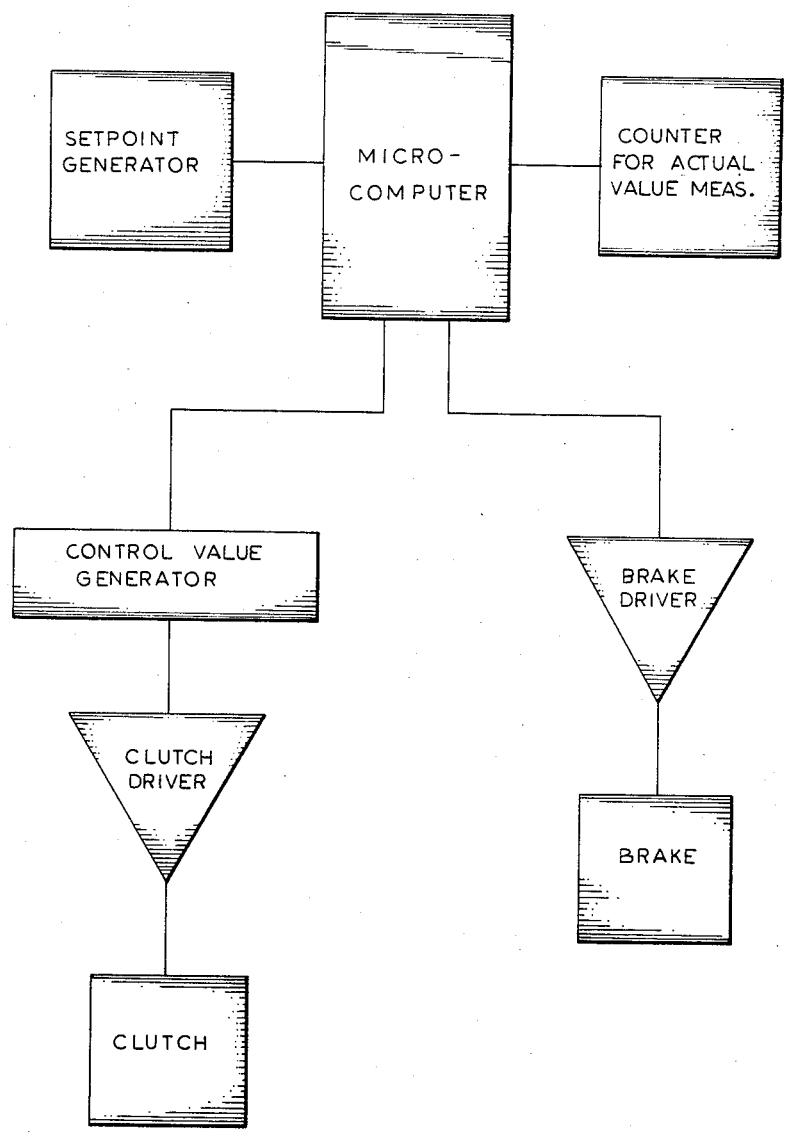
FIG. 5 is a block diagram illustrating another aspect of the invention.
Figure 6:
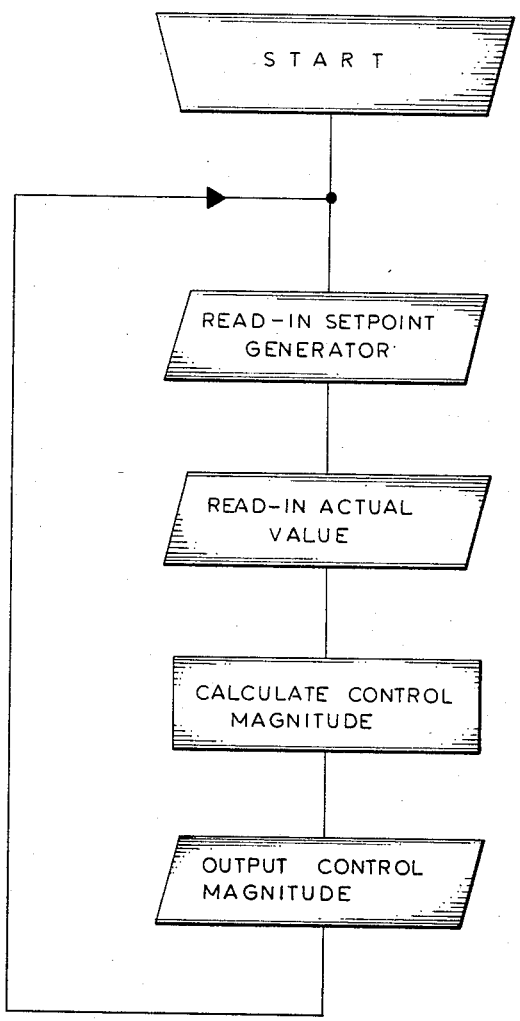
FIG. 6 is an information flow diagram elucidating upon the operation of the system shown in FIG. 5.

The operation of the control system utilizing the circuit elements already described will be more readily apparent from FIGS. 5 and 6.

Here the microcomputer 1 is shown to be associated with a set point generator or set point selector, e.g. the selector 13.

This speed set point is compared with the instantaneous value of the arm shaft speed and the control deviation signal derived from this comparison is utilized to calculate the duration of actuation of the clutch 8 and/or the brake.

For sewing machine operations with conventional slip drive, the transfer moment supplied by the clutch 8 and the brake are speed dependent. To permit a binary selection of desired set point values over the entire speed range without comparison, for each set point value a respective data block is stored in the program memory 14 of the microcomputer 1 with the respective constants. This data block, contains, apart from the binary values representing the magnitude of the set point, a set of parameters for the control algorithm. In this way an individual calculation of the set point value for each set point is possible.

Figure 9:
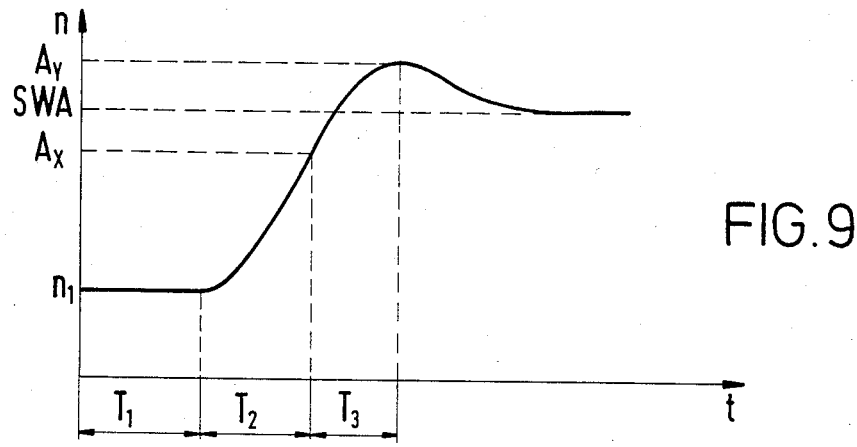
FIG. 9 is a graph of speed versus time illustrating the acceleration of the arm shaft.
Figure 10:
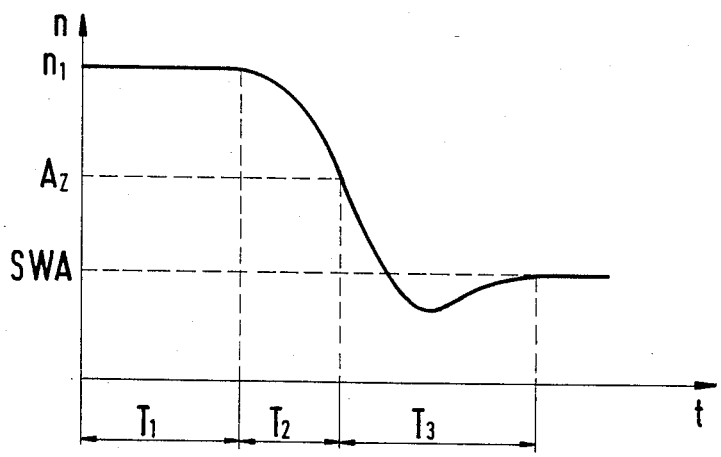
FIG. 10 is a graph of speed versus time illustrating the braking of the arm shaft.

The aforementioned data blocks can contain for each defined set point value SWA the following parameters:

A 1 corresponding to the set point SWA (see FIGS. 9 and 10).
A 2 corresponding to the constants of the set point for SWA.
A 3 corresponding to the actual value multiplicator for SWA.
A 4 corresponding to the speed threshold $A_x$ (see FIGS. 9 and 10).
A 5 corresponding to the speed threshold $A_y$ (see FIGS. 9 and 10).
A 6 corresponding to the speed threshold $A_z$ (see FIGS. 9 and 10).

Parameter A 1 is a binary value corresponding to the inverse of the set point speed. The parameters A 4, A 5 and A 6 are binary values for speed thresholds, overstepping and understepping the respective speed thresholds by the actual value setting in motion respective switching functions of the clutch 8 or the brake. Parameter A 3 effects the measurement of the actual value of the speed. At reduced set point speeds, the pulses of the rectangular voltage $U_c$ during a pulse or pause between two pulses of the rectangular voltage $U_i$ are counted to form the actual value. At high set point speeds the pulses $U_c$ are counted during a plurality of pulses or pauses of the signal $U_i$ and from parameter A 3 this number of pulses or pauses of the signal $U_i$ is introduced to permit calculation of the actual value.

Figure 7:
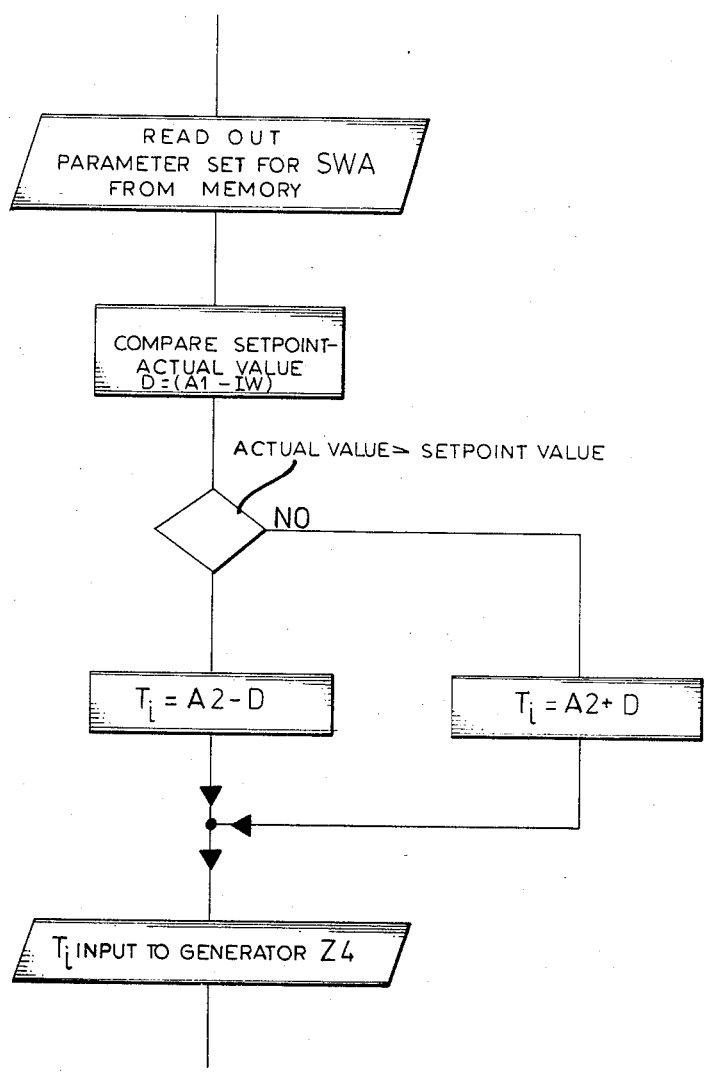
FIG. 7 is an information flow diagram illustrating the proportional (P) control mode.

FIG. 7 illustrates the formation of the control value, which is determined by the keying ratio V for the clutch 8.

As previously indicated, this keying proportion results in $V = T_i/T_p$ or $V = T_i/T_o - T_i$.

The speed control is described below with respect to two numerical examples in greater detail. In these examples the following values are presumed:

Set point speed n=600 rpm
Counting frequency $f_c$=MHz.

The set point generator produces 50 pulses with revolution of the arm shaft.

The data block has the following values (in digital format):

A 1=2000 (corresponding to a set point SWA=600 rpm)
A 2=490
A 3=0
A 4=2400 (corresponding to a speed threshold $A_x$=500 rpm)
A 5=1900 (corresponding to a speed threshold $A_y$=630 rpm)
A 6=1000 (corresponding to a speed threshold $A_z$=1200 rpm).

If the actual value measurement of the speed indicates a value IW=2300 corresponding to an instantaneous speed of 522 rpm, the microcomputer 1 calculates the difference D from the values A1 and IW as follows:

$$\begin{aligned} D &= A1 - IW \\ &= 2000 - 2300 \\ &= -300 \end{aligned}$$

The value $T_i$ is determined by the keying ratio V and the rectangular voltage $U_k$ (see FIG. 4) is determined as follows:

$$\begin{aligned} T_i &= A2 - D \\ &= 490 - (-300) \\ &= 790 \end{aligned}$$

If in another example the actual value IW=1700 corresponding to the instantaneous speed of 706 rpm, D is given by $$(D = 2000 - 1700 = 300)$$

In this case $$T_i = 490 - 300 = 190.$$

From these two examples it will be apparent that the more the actual speed value lies below the set point speed value, the greater will be the value of $T_i$.

The greater the actual speed value above the set point value, the smaller will be the value of $T_i$.

The value of $T_i$ is fed into the multivibrator Z4 which generates the rectangular voltage $U_k$ for the clutch 8.

If one starts with the assumption as previously indicated that $T_o$=1000, the first numerical example gives the following:

Set point speed=600 rpm
Actual speed=522 rpm
Keying ratio $V = T_i/T_o - T_i = 790/1000 - 790$; $T_p$=210

In the second example:
Set point speed=600 rpm

Actual speed = 706 rpm; V = 190/1000 − 190; $T_p = 810$.

$T_i$ represents the on-time for energization of the clutch 8 while $T_p = (1000 - T_i)$ represents the off-time for the energization thereof. Both numeral examples show clearly that the keying ratio V varies proportionally with the deviation of the actual speed from the set point speed. The changes are such that a speed drop below the set point value increased at on-time $T_i$ of the clutch while a speed increase above the set point value decreased at on-time and hence the system operates as a proportional controller.

A purely proportional control will, as known, result in residual deviations D which, for example, occur with changes of the loading or changes of clutch characteristics (friction coefficient or air gap). To counteract these effects, proportional control of the invention is associated with an integral control I.

Consequently, the value $T_i$ is correct by a time function representing the duration of the deviation D. This principle brings about a type of control known in control technology as PI control and results in a speed regulation without residual deviations.

Figure 8:
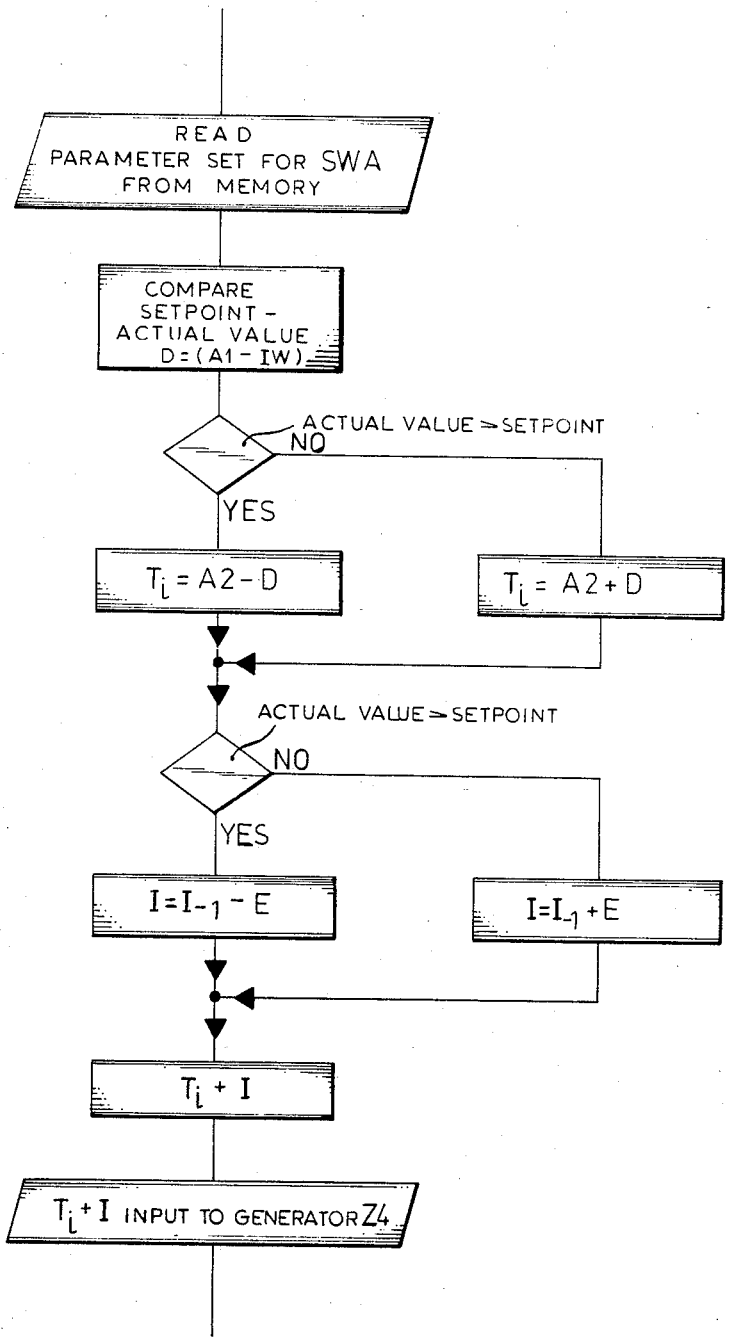
FIG. 8 is an information flow diagram illustrating the proportional-integral (PI) control mode.

FIG. 8 is an information flow diagram representing the characteristics of a PI controller according to the invention. The value for $T_i$ is formed in the manner previously described, i.e. in conjunction with FIG. 7.

To this value an integrated component I is added which is obtained by summation of constants E. After each calculation of the value $T_i$ in the proportional mode, the integral component I is added which is obtained by summation of constants E. After each calculation of the value $T_i$ in the proportional mode, the integral component I is added or subtracted in accordance with the relationship $$I = I_{-1} \pm E.$$

In this relationship $I_{-1}$ is the value of 1 obtained from a previous calculation. For each calculation of the control magnitude, the derived value I for the next calculation is stored and the constant E is added to it when the actual value speed is less than the set point speed or is subtracted when the actual speed value is greater than the set point speed.

The following numerical example is based upon a value for the constant E = 1. From the previous calculation, a value I of 10 for the integral component of the control magnitude was obtained. For the present calculation, therefore $I_1 = 10$. In the event that the instantaneous actual value is less than the set point speed, the new calculation is represented by $1 = 10 + 1$ and the magnitude delivered or read into the multivibrator Z4 is $T_i + 11$ while the magnitude 11 is stored as the integral component for the next calculation. If, during this subsequent calculation, the actual speed is less than the set point speed (i.e. the condition continues), the integral component will then be incremented, i.e. $I = 11 + 1$ and the magnitude stored in the multivibrator Z4 will be $T_i + 12$, the value 12 being stored for the next calculation.

Consequently, as long as the actual speed is less than the set point speed, there will be a progressive increase in the proportional component which is combined with the calculated value $T_i$ which is used to generate the control magnitude. The keying ratio V for the clutch is increased and thus the torque transfer or moment of the clutch and the clutch current will be increased to correspondingly raise the speed of the arm shaft.

If at the next calculation the actual speed is instantaneously greater than the set point speed, the proportional component will be modified in accordance with the relationship $I = 12 − 1$ and hence the value read into the multivibrator Z4 will be $T_i + 11$ while the magnitude 11 will be stored for use as the integral component base for the next calculation.

If during the next 11 calculations, the actual speed is greater than the set point speed, the integral component will be incrementally diminished by one unit with each calculation until $I = 0$. If the actual value then continues to be greater than the set point speed, I will go negative and hence values less than the instantaneously calculated $T_i$ will be stored in the multivibrator Z4. For example, from the next five calculations in which the value I is each time diminished by one unit, $I = 5$ and the magnitude applied to the multivibrator Z4 will be $T_i - 5$.

The time between two calculations of the integral component I is the integration time $T_n$ and this magnitude can be programmed into the microcomputer and is determined by the time required for carrying out the program instructions represented by the information flow diagram of FIG. 6.

Thus when only one microcomputer 1 is used, it is necessary for each calculation to carry out the steps of reading in the set point value from the set point generator, reading in the actual value, effecting actual value-set point comparison and forming the control magnitude in accordance with the PI-algorithm described.

In this manner the microcomputer 1 can also be programmed to perform other speed control functions and nevertheless can provide the necessary integration time $T_n$ since it is relieved from continuous participation in the control operations.

FIG. 9 is a graph representing the acceleration of the arm shaft to a new set point value without the use of the brake, indicating how an overswing of the speed is practically avoided. During the time $T_1$ the control system holds the speed practically constant at $n_1$. Beginning $T_2$, the shaft is accelerated to the new set point speed SWA, this time period being required to reach the speed threshold $A_x$ with the clutch 8 fully energized. During the time $T_3$, the clutch had been energized and after reaching the threshold $A_y$ the rectangular voltage $U_k$ takes over to remain at the new set point value speed of the arm shaft.

FIG. 10 is a corresponding graph showing the braking of the arm shaft speed to the new set point value.

Over the interval $T_1$ the control system maintains the speed at $n_1$ substantially constant. Within the time interval $T_2$ the clutch 8 is deenergized and the brake energized. After reaching the speed threshold $A_x$ the brake is cut out and the control resumed based upon the magnitude $U_k$ delivered by the multivibrator Z4.

Figure 11:
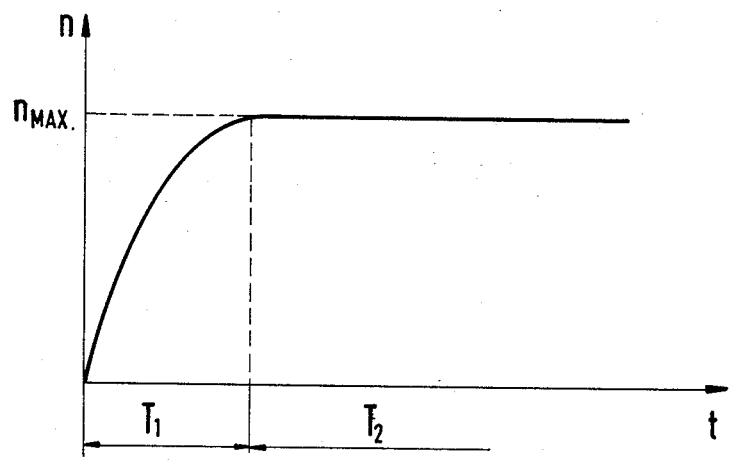
FIG. 11 is a graph of speed versus time illustrating the acceleration of the arm shaft to maximum speed.

Finally, in FIG. 11, I have shown the operation of a sewing machine at maximum speed. This operation generally is the predominant operation mode for the sewing machine. During the time $T_1$ the clutch is fully energized and the clutch 8 is only controlled by speed monitoring after reaching the maximum speed value with the current keying value V. This is possible with a decrease in speed since even at full speed, the clutch 8 is only energized part of the time and full torque need only be delivered during the period $T_1$ for speed increase.

It is also possible to utilize the control system of the invention for the fully digitalized speed control of the arm shaft of a sewing machine driven by a direct current motor. This speed is, as is known, dependent upon the amplitude of the operating voltage.

In this case, the rectangular voltage $U_k$ from the multivibrator Z4 can be applied directly to the DC-motor. As has already been described, the keying ratio of the rectangular voltage $U_k$ changes in response to deviations of the actual speed from the set point speed. As a consequence, each keying ratio V can give rise to an average value of the rectangular voltage $U_k$ which can be applied as the operating voltage to the DC-motor. If the load increases, its speed decreases and the control system generates a new keying system V with a higher mean value of $U_k$. This increases the speed of the DC-motor again to its original value and eliminates the need for a brake/clutch combination.

I claim:

1. A fully digitalized control system for a speed of an arm shaft of a sewing machine of the type in which at least one speed-regulating member is provided for the shaft, said system comprising:

a microcomputer and two circuit elements connected to each other and to said microcomputer by a control bus and a data bus for data transfer between each element and the microcomputer, a first one of said elements being provided with a pair of counters each having a clock input and a gate input, the second of said elements being provided with a bit-rate generator having a clock input and an output and a retriggerable programmable monostable multivibrator having a clock input, a gate input, and an output;

means connecting a clock output of said microcomputer to said gate inputs to apply a quartz-stabilized counting frequency $f_c$ thereto;

means for deriving a rectangular voltage signal $U_i$ with a frequency $f_i$ substantially smaller than the frequency $f_c$ and representing the actual speed of said shaft for applying said signal $U_i$ to the gate input of either said first or said second counter;

an inverter connected between said deriving means and the gate input of another of said counters for applying an inverse of said signal $U_i$ to said other of said counters and to a port of said microcomputer whereby pulses of the frequency $f_e$ for each of a number of comparisons are accumulated during pulses of the signal $U_i$ in said one of said counters and during intervals between pulses of the signal $U_i$ in the other of said counters said count accumulated in one of said counters during an immediately preceding pulse or interval is compared by said microcomputer as the inverse of an actual value signal with a binary inverse set point signal to produce a keying ratio, said microcomputer containing preprogrammed stored data blocks for each of a plurality of set point values for the shaft speed with individual parameters for generating the respective keying ratios;

means for connecting said output of said bit-rate generator to said gate input of said monostable multivibrator; and means for connecting the output of said monostable multivibrator with a driver for said member so as to apply a rectangular voltage $U_k$ to said driver representing a control magnitude for the speed of said shaft determined by the keying ratio and developed by said bit-rate generator and said monostable multivibrator of said other element.

2. The system defined in claim 1 wherein said member is a clutch connected between an electric motor and said shaft, the frequency $f_c$ is very large by comparison to the frequency $f_i$ and the rectangular voltage $U_k$ is applied directly to an amplifier forming the driver for said clutch.

3. The system defined in claim 1 wherein an integration control is provided for the control magnitude over an integrating time determined substantially by the time required for cycling said microcomputer through a program in which said microcomputer receives data from said one of said elements, compares the received data with a selected data block, and outputs data to the other of said elements.

4. The system defined in claim 1 wherein said voltage $U_k$ is applied to a direct current motor for controlling the speed of said shaft.

5. A fully digitalized method of controlling a speed of an arm shaft of a sewing machine which comprises the steps of:

(a) storing data blocks representing respective set point values for a multiplicity of desired speeds of said shaft, each of said data blocks including in addition to a respective set point value of speed, parameters capable of determining respective keying ratios;

(b) deriving a rectangular voltage signal $U_i$ at a first frequency $f_i$ representing an actual speed of said shaft and proportions thereto;

(c) generating a train of counting pulses $U_c$ of a rectangular waveform and a frequency $f_c$ substantially greater than the frequency $f_i$;

(d) accumulating for each pulse of the signal $U_i$ a count of the pulses of the counting frequency $f_c$ and for each interval between the pulses of the signal $U_i$ another count of the pulses of the counting frequency $f_c$;

(e) comparing an inverse of a selected one of the counts formed in step (d) from the immediately preceding half cycle of the signal $U_i$ preceding the comparison with an inverse set point value of a respective previous stored data block to generate a control magnitude proportional to the difference, said control magnitude being in the form of an output frequency $U_k$ of rectangular waveform; and (f) controlling the speed of said shaft in response to said signal $U_k$.

6. The method defined in claim 5, further comprising generating a signal proportional to said difference and modifying said signal proportional to said difference by an integration value to form said signal $U_k$.

7. The method defined in claim 6 wherein said integration value is determined by detecting the direction of deviation of the actual value from the set point value of a previous comparison and modifying a stored magnitude from a previous comparison either upwardly or downwardly in response to the determination.

8. The method defined in claim 5 wherein said data blocks are stored in a microcomputer and said signal $U_k$ is formed in a first circuit element connected to said microcomputer by a control bus and a data bus and said counts are accumulated in another circuit element connected to said microcomputer by a control bus and a data bus, said microcomputer being programmed to periodically derive data from said other element and deliver data to said first element within a program cycling time.

9. The method defined in claim 8, further comprising effecting an integration with an integrating time substantially equal to said cycling time whereby said signal $U_k$ represents a proportional-integral response to deviations of the actual value of said speed from the selected set point value.

10. The method defined in claim 5, further comprising the step of operating an electric motor driving said shaft directly with said signal $U_k$.

11. The method defined in claim 5 wherein a clutch is coupled between a motor and said shaft, said method comprising driving said clutch with the signal $U_k$.

* * * * *